United States Patent [19]

Go

[11] Patent Number: 5,766,403
[45] Date of Patent: Jun. 16, 1998

[54] APPARATUS FOR CHEMICAL REMOVAL OF PROTECTIVE COATING AND ETCHING OF CABLES WITH FIBER-LIKE SUBSTRATE

[75] Inventor: Vinson L. Go, Uncasville, Conn.

[73] Assignee: The United States of America as represented by the Secretary of the Navy, Washington, D.C.

[21] Appl. No.: 494,423

[22] Filed: Jun. 26, 1995

[51] Int. Cl.⁶ .................................................. C23F 1/02
[52] U.S. Cl. ......................... 156/345; 118/420; 118/428
[58] Field of Search .......................... 156/345; 118/420, 118/428; 216/90, 91; 65/31

[56] References Cited

U.S. PATENT DOCUMENTS

| | | | |
|---|---|---|---|
| 1,769,702 | 7/1930 | London et al. | 216/91 |
| 3,350,248 | 10/1967 | Demarest, Jr. et al. | 65/31 |
| 3,560,177 | 2/1971 | DeLajarte et al. | 65/31 |
| 3,647,596 | 3/1972 | Thate et al. | 156/345 |
| 5,116,447 | 5/1992 | Kimura et al. | 156/345 |
| 5,628,921 | 5/1997 | Beckett | 216/91 |

*Primary Examiner*—R. Bruce Breneman
*Assistant Examiner*—George Goudreau
*Attorney, Agent, or Firm*—Michael J. McGowan; Prithvi C. Lall; Michael F. Oglo

[57] ABSTRACT

An apparatus and method for stripping the protective coating from and etching a fiber optic cable or fiber-like substrate utilizing a housing which is filled with processing chemicals and has an aperture and positioned for securely holding a selected cable segment over the chemicals before processing. The housing is covered by a lid which has handles for raising and lowering the lid and tabs which, when the lid is lowered, contact the selected cable segment and push it through the housing aperture into the processing chemicals. When the lid is closed, it cooperates with a channel or guide in the housing to keep the segment from moving during processing.

3 Claims, 2 Drawing Sheets

APPARATUS FOR CHEMICAL REMOVAL OF PROTECTIVE COATING AND ETCHING OF CABLES WITH FIBER-LIKE SUBSTRATE

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1). Field of the Invention

This invention relates to processing of cables with fiber-like substrates, and in particular, to an apparatus for chemically removing protective coating from or etching a particular fiber-like substrate cable segment.

(2). Description of the Prior Art

Fiber optic cables or other fiber-like substrates such as small diameter tubes, wires, Kevlar fibers and nylon fibers are provided with various types of coatings to protect the substrate. Before a selected section of a fiber optic cable or fiber-like substrate can be further processed or joined to another substrate, it may be necessary to first strip or remove the protective coating. There are three basic techniques for removing the protective coating: mechanically, chemically or by burning.

The coating is removed mechanically by physically cutting through the coating around the entire circumference of the fiber-like substrate and scraping the separated coating off the substrate surface, much like the process used to strip the plastic insulator off an electrical wire. However, this technique can only be used to remove the coating from the ends of a fiber optic cable or fiber-like substrate.

The coating can also be removed by subjecting the coating to extreme heat or flame which causes the coating to combust, thereby exposing the substrate or cable surface. It is difficult, however, to control the heat or flame so that the removal of the coating is localized to a selected area. Heating the coating also causes the cable or substrate to be heated, which can lead to damage to the cable or substrate.

The third technique for removing the protective coating is by dipping the segment of a fiber optic cable or fiber-like substrate into a shallow, open container of chemicals or acids. A similar technique is utilized to chemically etch the substrate or cable after the coating has been removed. The volatile chemicals typically evaporate quickly, requiring the addition of more chemicals. The container edges also frequently damage the fragile substrate by abrasion and there is no easy way to assure that only the selected sections of the coating are stripped. In addition, there is the possibility that the container will tip over while the coating is being stripped, spilling the chemicals and possibly damaging the cable or substrate.

Accordingly, what is needed is an apparatus that either strips or removes the protective coating from specific segments of small diameter cylindrical or fiber-like substrates. Furthermore, the apparatus needs to be adaptable to chemically etch specific segments of a fiber-like substrate or fiber optic cable, while reducing the amount of volatile chemicals needed and the risk of chemical spills. This apparatus and technique would reduce the burden of disposing of chemicals, processing volatized chemicals, and the potential for damage due to chemical spillage. The apparatus should also minimize damage to fiber-like substrates by abrasion while stripping the coating, and be able to strip a coating or etch a substrate anywhere along the length of the fiber-like substrate.

SUMMARY OF THE INVENTION

The present invention relates to an apparatus for chemically stripping or etching the protective coating from a selected segment of cable having a fiber-like substrate by submerging and holding the fiber-like substrate in processing chemicals. The apparatus includes a housing with a chemical holding container containing a predetermined volume of processing chemicals. The chemical holding container has an aperture disposed parallel to the top surface of the housing and a cable segment positioner means, for positioning the selected cable segment over the chemical holding container before the cable segment is chemically processed.

The apparatus also includes a cover for the chemical holding container which includes a chemical holding container handler for raising and lowering the cover and which, when fully lowered, contacts the top surfaces of the chemical holding container and the housing.

The cover also includes a cable contacting means for contacting the selected cable segment when it is disposed over the chemical holding means aperture as the cover is lowered. This contacting means urges the selected cable segment through the chemical holding means aperture as the cover is lowered so that when the cover is fully lowered, the cable segment is submerged to the desired depth in the processing chemicals. When fully lowered, the cover cooperates with the cable positioner to securely keep the fiber-like substrate from moving while the selected cable segment is submerged in the processing chemicals.

The present invention also features a method for chemically either stripping the protective coating or etching a selected segment of cable having a fiber-like substrate by submerging the cable segment in processing chemicals at a desired depth and by holding the fiber-like substrate of the cable segment while chemically processing it.

The method is comprised of the steps of providing a housing which includes a chemical holding means with an aperture parallel to the top surface of the housing and a segment positioner which is disposed in the top surface of the housing, adding a predetermined volume of processing chemicals to the chemical holding container, and providing a cover for the chemical holding means which has a container for contacting the selected cable segment so that the selected cable segment will be submerged in the processing chemicals to a desired depth.

The method further involves pre-positioning the selected cable segment in the segment positioner so that the selected cable segment is disposed over the aperture in the chemical holding container. The cover is lowered so that the cover contacting means contacts the selected cable segment disposed over the chemical holding container aperture and urges the selected cable segment through the aperture. The cable segment is therefore submerged the desired depth, and the fiber-like substrate is held in place, by the cooperation of the chemical holding container cover and the segment positioner when the cover is fully lowered so that it contacts the top surface of the housing. The cable segment is kept submerged in the processing chemicals for a predetermined time.

BRIEF DESCRIPTION OF THE DRAWINGS

These and other features and advantages of the present invention will be better understood in view of the following description of the invention taken together with the drawings wherein.

DESCRIPTION OF THE PREFERRED EMBODIMENT

Figure 1:
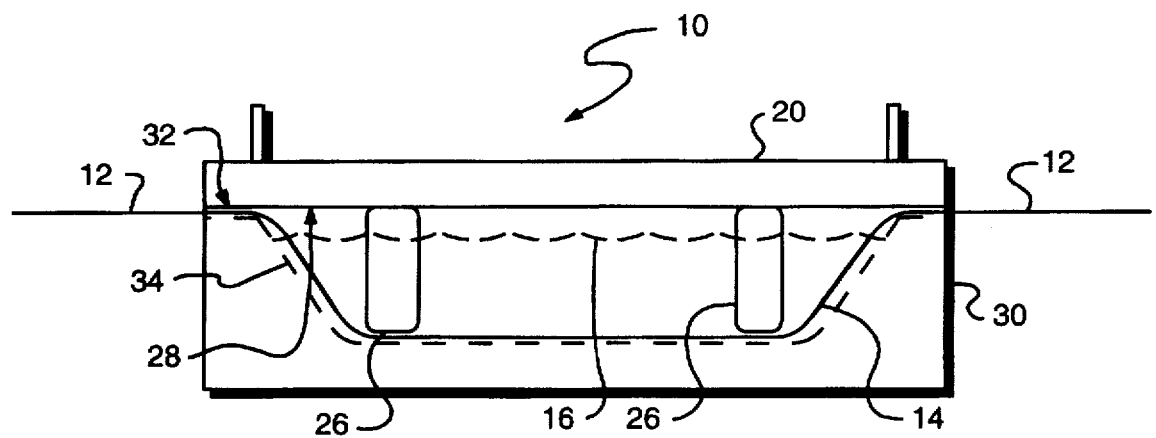
FIG. 1 is a side view of the apparatus for chemical removal of the protective coating and etching of cables with fiber-like substrates according to the teachings of the invention.

The apparatus 10, as shown in FIG. 1, of the present invention for stripping and etching a fiber-like substrate or fiber optic cable 12 includes a cover 20 and a housing 30. The tabs 26 of the cover 20 extend into the chemical container 34 of the housing 30 thereby disposing the selected segment 14 of the fiber-like substrate or fiber optic cable 12 into the chemicals 16 for processing (i.e., stripping or etching). The weight of the cover 20, typically 4 ounces causes the selected segment 14 to remain submerged in the chemicals 16 without an external force (e.g., hand pressure) acting on the cover 20. After processing, the cover 20 is lifted, releasing the selected segment 14. The tension in the fiber-like substrate or fiber optic cable 12, as well as the natural buoyancy of the selected segment 14, causes selected segment 14 to come out of the chemicals 16 when released. The processed selected segment 14 is then removed from the apparatus 10, another segment put into position, and the process repeated.

Figure 2:
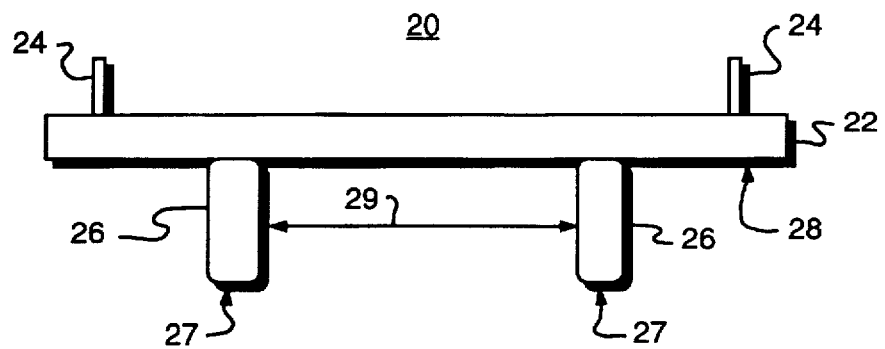
FIG. 2 is a side view of the cover portion of the apparatus shown in FIG. 1.

In one embodiment, the cover 20 FIG. 2, includes a lid 22 to which is secured a pair of handles 24 and a pair of tabs 26. Three functions are performed by the cover 20. First, it greatly reduces the evaporation rate of the chemicals 16 used to process the fiber-like substrate or fiber optic cable 12. Secondly, it causes the selected segment 14 to be submerged in the chemicals 16. Thirdly, it secures the fiber-like substrate or fiber optic cable 12 such that the selected segment 14 does not move while submerged.

The bottom surface 28 of the lid 22 cooperates with the top surface 32 of the housing 30 to reduce the evaporation rate of the chemicals 16. The lid bottom surface 28 and the housing top surface 32 cooperate so they and the chemical container 34 form an enclosed chamber isolated from the atmosphere. The lid bottom surface 28 is also used to secure the fiber-like substrate or fiber-like cable 12 so that the selected segment 14 does not move while submerged.

The tabs 26, approximately ¾" deep×½" long×¼" wide in size extend from the bottom surface 28 and contact the selected segment 14 of the fiber-like substrate. The bottom surface 27 of each tab 26 is provided with rounded edges and sized to minimize the potential for abrasive damage to the selected segment 14 while it is in contact with the tab bottom surface 27. The tab bottom surface 27 is also sized and shaped to assure that the selected segment 14 does not slide off while the selected segment 14 is being urged into the chemical 16.

The length of the tab 26 is predetermined so that the selected segment 14 will be submerged in the chemicals 16 to the desired depth. In general the number of tabs 26, tab spacing 29 and the overall sizing of the tabs 26 are established based on consideration of the depth at which selected segment 14 is to be submerged, the force required to control the selected segment 14 while it is submerged, and the actions required to avoid abrasive damage to the selected segment 14. While tabs 26 are illustrated and described but this is not a limitation, as there are a number of ways known in the art (e.g., wheels) which can be used for urging the selected segment 14 into the chemicals 16 for processing.

Handles 24 are secured to the top surface of the lid 22 so that the cover 20 can be selectively lowered onto or raised from the housing 30. While a pair of handles 24 are illustrated, this is not a limitation, as there may be any number of handles provided to lower and raise the cover 20. Also, the cover 20 may be raised and lowered by any of a number of other means well known in the art.

Figure 3:
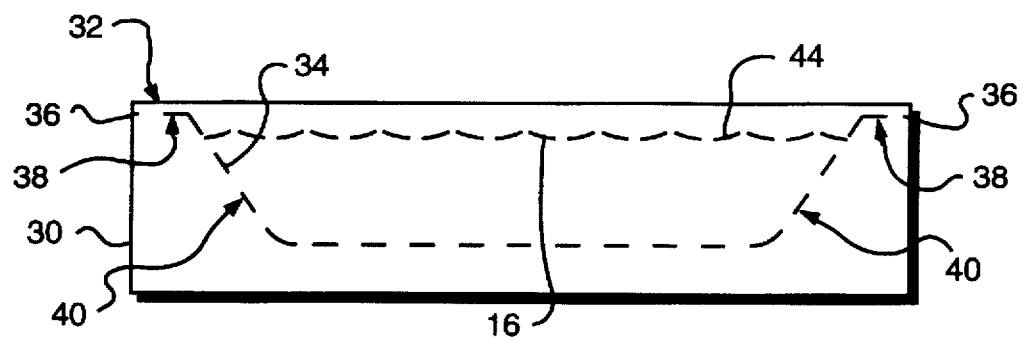
FIG. 3 is a side view of the housing portion of the apparatus of FIG. 1.
Figure 4:
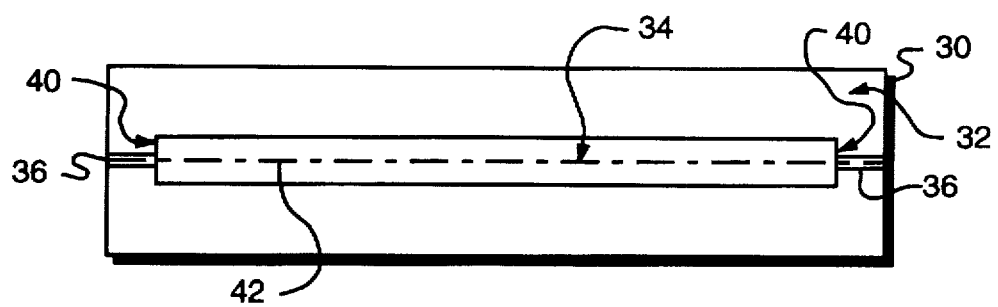
FIG. 4 is a top view of the housing FIG. 3.

The housing 30, FIGS. 3, and 4 holds the chemicals 16 for processing the selected segment 14, which includes a chemical container 34. The tabs 26 of the cover 20 are fully disposed in the chemical container 34 when the cover 20 is lowered onto the housing 30 such that the lid bottom 28 contacts the container top surface 32, FIG. 1. The chemical container 34 is sized to hold the requisite volume of chemicals 16 required to process the fiber-like substrate or fiber optic cable 12 without causing any spillage when the fiber-like substrate or fiber optic cable 12 and cover tabs 26 are disposed in the chemicals 16.

The housing 30 also contains two guide channels 36, disposed in the housing top surface 32 and acting as a cable segment positioner. The fiber-like substrate or fiber optic cable 12 is prepositioned in the guide channels 36 before it is processed. The guide channels 36 are much narrower than the chemical container 34 and typically are sized to be slightly wider than the width of fiber-like substrate or fiber optic cable 12 disposed in the guide channel 36. The depth of the guide channel 36 is designed so that, when the cover 20 is fully lowered onto the housing 30 the lid bottom surface 28 cooperates with the bottom surface 38 of the guide channels 36 to hold the fiber-like substrate or fiber optic cable 12 while the selected segment 14 is submerged in the chemicals 16.

For example, when processing a fiber substrate having an outside diameter, including the protective coating, of 250 µm (1 µm=$10^{-6}$ meter), the guide channels would be approximately 300 µm in width and 250 µm in depth.

The guide channels 36 are disposed opposite each other at each end 40 of the chemical container 34 such that they have a common center line 42 approximately centered or axially aligned with aperture 34. One end of each guide channel 36 communicates with the chemical container 34. Thus, when the fiber-like substrate or fiber optic cable 12 is positioned in the guide channels 36, it extends through the chemical container 34, but above the surface 44 of the chemicals 16. In this way, the selected segment 14 can be precisely positioned in the housing 30 before the cover 20 is lowered and the selected segment 14 is processed.

The ends 40 of the chemical container 34 typically slope upwards from the bottom of the container 44 to the guide channel bottom surface 38. The edges of the sloped ends are also rounded so that the fiber-like substrate or fiber optic cable 12 is not exposed to sharp corners. This is done to minimize potential damage from abrasion.

The housing 30 and cover 20, including associated parts (e.g., tabs 26) are preferably made from polytetrafluoroethylene (Teflon), however nylon, polycarbonate, high-density polyethylene, ceramic and other materials which are resistant to acids, bases, or strong solvents may also be used.

While FIGS. 1–4 illustrate an apparatus that processes one selected segment 14 at a time, this is not a limitation. The apparatus 10 may be adapted to process a plurality of selected segments 14 simultaneously by providing a plurality of guide channels 36 in the housing 30 for guiding and holding the plurality of fiber-like substrates or fiber optic cables 12. The housing 30 may have a single chemical container 34 in which the plurality of selected segments 14 are submerged. Alternatively, the housing 30 may have a plurality of chemical containers 34, one for each selected segment 14. The cover 20 may be appropriately adapted such that the plurality of selected segments 14 are disposed in the chemicals 16 when the cover 20 is fully lowered. The container 30 and cover 20 may have any shape which can securely hold a fiber-like substrate or fiber optic cable 12 while it is being processed, can hold the required volume of chemicals 16 for processing and in general establishes a stable structure so the apparatus 10 is not so easily tipped over.

Using known techniques, the apparatus 10 of the present invention can be adapted so that the above-described process can be performed automatically. For example, a fiber optic cable is typically unwound from one reel and wound onto another wheel as the cable is being processed. A selected segment or plurality of selected segments 14 may be processed automatically by using known techniques for indexing wheel rotation, selectively lowering and raising a cover 20, and controlling the sequencing and timing of the operation in conjunction with apparatus 10.

The apparatus 10 of the present invention minimizes evaporation of the chemicals 16 and requires a smaller volume of chemicals 16 when compared to prior art techniques for processing a fiber-like substrate or fiber optic cable 12. The apparatus 10 of the present invention also minimizes damage to fragile substrates caused by abrasion, including scratching of the fiber-like substrate or fiber optic cable 12, and allows a protective coating to be removed from any selected segment 14 along the length of a fiber-like substrate or fiber optic cable 12, including selected segments 14 that are between the fiber-like substrate or fiber optic cable 12 ends. The apparatus 10 holds or otherwise immobilizes the fiber-like substrate or fiber optic cable 12 while the chemical processing is being done so that only the selected segment 14 is processed and unwanted cable movement is avoided, without requiring the constant supervision and intervention of an individual.

In light of the above, it is therefore understood that within the scope of the appended claims, the invention may be practiced otherwise than as specifically described.

What is claimed is:

1. An apparatus for chemically stripping the protective coating from at least one selected segment of a cable having a fiber-like substrate by submerging said selected cable segment in processing chemicals to a desired depth, and for holding said fiber-like substrate of said selected cable segment while chemically processing said selected cable segment, comprising:

a housing having a top surface;

a chemical holding container, disposed in said housing, for holding a volume of processing chemicals, said chemical holding container having an aperture disposed parallel to said top surface of said housing;

cable segment positioner, disposed in said housing, for positioning said selected cable segment over said aperture of said chemical holding container before said coating of said selected cable segment is chemically stripped;

a chemical holding container cover having top and bottom surfaces;

a chemical holding container cover handler disposed on said top surface of said chemical holding container cover for raising and lowering said chemical holding container cover, wherein when said chemical holding container cover is fully lowered, said bottom surface of said cover contacts said top surface of said housing; and at least one cable contacting means, affixed to said bottom surface of said chemical holding container cover and disposed over said aperture of said chemical holding container as said cover is lowered, for contacting said selected cable segment, wherein said at least one cable contacting means urges said selected cable segment through said aperture of said chemical holding container as said chemical holding container cover is lowered such that when said container cover is fully lowered, said selected cable segment is submerged to a desired depth in said processing chemicals disposed in said chemical holding container, wherein when said chemical holding container cover is fully lowered, said chemical holding container cover cooperates with said cable segment positioner to hold said fiber-like substrate of said selected cable segment while said selected cable segment is submerged in said processing chemicals.

2. The apparatus of claim 1 wherein said cable segment positioner is disposed in said top surface of said housing.

3. The apparatus of claim 2 wherein said cable segment positioner includes a guide channel.

* * * * *